(12) United States Patent
Ueyoko et al.

(10) Patent No.: US 10,350,947 B2
(45) Date of Patent: Jul. 16, 2019

(54) AIRCRAFT TIRE

(71) Applicant: The Goodyear Tire & Rubber Company, Akron, OH (US)

(72) Inventors: Kiyoshi Ueyoko, Copley, OH (US); Badal Das, Strongsville, OH (US); Robert John Boehlefeld, Brecksville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 819 days.

(21) Appl. No.: 14/851,716

(22) Filed: Sep. 11, 2015

(65) Prior Publication Data

US 2016/0167450 A1 Jun. 16, 2016

Related U.S. Application Data

(60) Provisional application No. 62/092,484, filed on Dec. 16, 2014.

(51) Int. Cl.
*B60C 9/02* (2006.01)
*B60C 9/06* (2006.01)
(Continued)

(52) U.S. Cl.
CPC ............ *B60C 15/0009* (2013.01); *B60C 9/04* (2013.01); *B60C 9/06* (2013.01); *B60C 9/09* (2013.01);
(Continued)

(58) Field of Classification Search
CPC .... B60C 2009/0253; B60C 2009/0458; B60C 2009/0466; B60C 2009/045; B60C 9/04;
(Continued)

(56) References Cited

U.S. PATENT DOCUMENTS

| 4,155,394 A | 5/1979 | Shepherd et al. |
| 4,893,665 A | 1/1990 | Reuter et al. |

(Continued)

FOREIGN PATENT DOCUMENTS

| GB | 2104011 A | 3/1983 |
| JP | 0268207 A | 3/1990 |

(Continued)

OTHER PUBLICATIONS

Machine Translation: JP-02068207-A; Nakagawa, Tsuneyuki; (Year: 2018).*

(Continued)

*Primary Examiner* — Robert C Dye
*Assistant Examiner* — Kendra Ly
(74) *Attorney, Agent, or Firm* — June E. Rickey

(57) ABSTRACT

A pneumatic tire is disclosed having two annular bead portions having a bead core. A carcass extends between the bead portions through sidewall portions and a tread portion, wherein the carcass includes at least two axially inner plies which extend down from the tread and axially inward of the bead core, said at least two axially inner plies being wound around the bead core forming respective turn-ups, each turnup being located axially outward of the bead core. The carcass further includes a first axially outer ply which extends down from the tread towards the bead core and positioned axially outward of the bead core, wherein at least one of the axially outer plies is formed from reinforcements having a higher break strength than the reinforcements of the axially inner plies.

11 Claims, 2 Drawing Sheets

(51) Int. Cl.
  *B60C 15/00* (2006.01)
  *B60C 9/04* (2006.01)
  *B60C 9/09* (2006.01)
(52) U.S. Cl.
  CPC .... *B60C 15/0018* (2013.01); *B60C 2009/045* (2013.01); *B60C 2009/0425* (2013.01); *B60C 2009/0458* (2013.01); *B60C 2200/02* (2013.01)
(58) Field of Classification Search
  CPC ........ B60C 15/0018; B60C 2009/0416; B60C 2009/0425; B60C 2009/0475; B60C 15/0009
  See application file for complete search history.

(56) References Cited

U.S. PATENT DOCUMENTS

| | | | |
|---|---|---|---|
| 5,036,896 A * | 8/1991 | Welter | B60C 9/2009 152/527 |
| 6,571,847 B1 | 6/2003 | Ueyoko | |
| 6,799,618 B2 | 10/2004 | Reuter et al. | |
| 2012/0037290 A1 | 2/2012 | Itami | |
| 2012/0097311 A1* | 4/2012 | Ueyoko | B60C 15/0018 152/552 |

FOREIGN PATENT DOCUMENTS

| | | | |
|---|---|---|---|
| JP | 02068207 A * | 3/1990 | |
| JP | 06191239 A * | 7/1994 | |
| JP | 2009083519 A | 4/2009 | |

OTHER PUBLICATIONS

Machine Translation: JP06191239A; Mitsuyoshi, Isao; (Year: 2018).*
European Search Report dated May 4, 2016 for Application Serial No. 15200242.
U.S. Appl. No. 14/579,128, filed Dec. 22, 2014.

* cited by examiner

AIRCRAFT TIRE

FIELD OF THE INVENTION

This invention relates to pneumatic tires having a carcass and a belt reinforcing structure, more particularly to high speed heavy load tires such as those used on aircraft.

BACKGROUND OF THE INVENTION

The radial carcass reinforcements of aircraft tires generally comprise several plies of textile cords, which are anchored to at least one annular bead member. A first group of reinforcing plies are generally wound around said annular bead member from the inside to the outside, forming turn-ups, the respective ends of which are radially spaced from the axis of rotation of the tire. The second group of plies are generally wound around the annular bead member from the outside to the inside of the tire.

Aircraft tires typically use numerous layers of ply which can significantly contribute to the tire weight. The numerous layers of ply may result in bead durability issues. It is thus desired to provide a lightweight efficient tire structure having improved bead durability. It is a further desired to provide an improved bead structure wherein the use of inside turn-up plies and outside turndown plies and their respective locations are optimized. Thus an improved aircraft tire is needed, which is capable of meeting high speed, high load and with reduced weight.

SUMMARY OF THE INVENTION

A pneumatic tire in accordance with the present invention includes two annular bead portions, a carcass, and a belt reinforcement layer. The carcass extends between the bead portions through sidewall portions and a tread portion, wherein the carcass includes at least two axially inner plies which extend down from the tread and axially inward of the bead core, said at least two axially inner plies being wound around the bead core forming respective turn-ups, each turnup being located axially outward of the bead core; said carcass further including a first axially outer ply which extends down from the tread towards the bead core and positioned axially outward of the bead core, wherein the first axially outer ply is formed of reinforcements having a higher strength than the reinforcements of the axially inner plies.

DEFINITIONS

"100 percent Modulus" means the force in mega-pascals (MPa) required to produce 100 percent elongation (e.g., stretch to two times original length).

"300 percent Modulus" or "M300 modulus" means the force in mega-pascals (MPa) required to produce 300 percent elongation (e.g., stretch to four times original length).

"Apex" means an elastomeric filler located radially above the bead core and between the plies and the turnup ply or axially outside the turnup ply.

"Annular" means formed like a ring.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread (e.g., the whole tire).

"Chafer" refers to a narrow strip of material placed around the exterior of the bead to protect bead structures from the rim, distribute flexing radially above the rim, and to better seal the tire to the rim.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). Dtex means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Gauge" refers generally to a measurement, and specifically to a thickness measurement.

"Inner" means toward the inside of the tire and "outer" means toward its exterior.

"Innerliner" means the layer or layers of elastomer or other material that form the inside surface of a tubeless tire and that contain the inflating fluid within the tire.

"Lateral" means an axial direction.

"Load Range" means load and inflation limits for a given tire used in a specific type of service as defined by tables in The Tire and Rim Association, Inc.

"Normal Load" means the specific design inflation pressure and load assigned by the appropriate standards organization for the service condition for the tire.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Sidewall" means that portion of a tire between the tread and the bead.

"Stiffness ratio" means the value of a control belt structure stiffness divided by the value of another belt structure stiffness when the values are determined by a fixed three point bending test having both ends of the cord supported and flexed by a load centered between the fixed ends.

"Tread" means a molded rubber component which, when bonded to a tire casing, includes that portion of the tire that comes into contact with the road when the tire is normally inflated and under normal load.

"Tread width" means the arc length of the tread surface in a plane including the axis of rotation of the tire.

"Turnup end" means the portion of a carcass ply that turns upward (i.e., radially outward) from the beads about which the ply is wrapped.

BRIEF DESCRIPTION OF THE DRAWINGS

The present invention will be described by way of example and with reference to the accompanying drawing, in which.

DETAILED DESCRIPTION OF AN EXAMPLE OF THE PRESENT INVENTION

Figure 1:
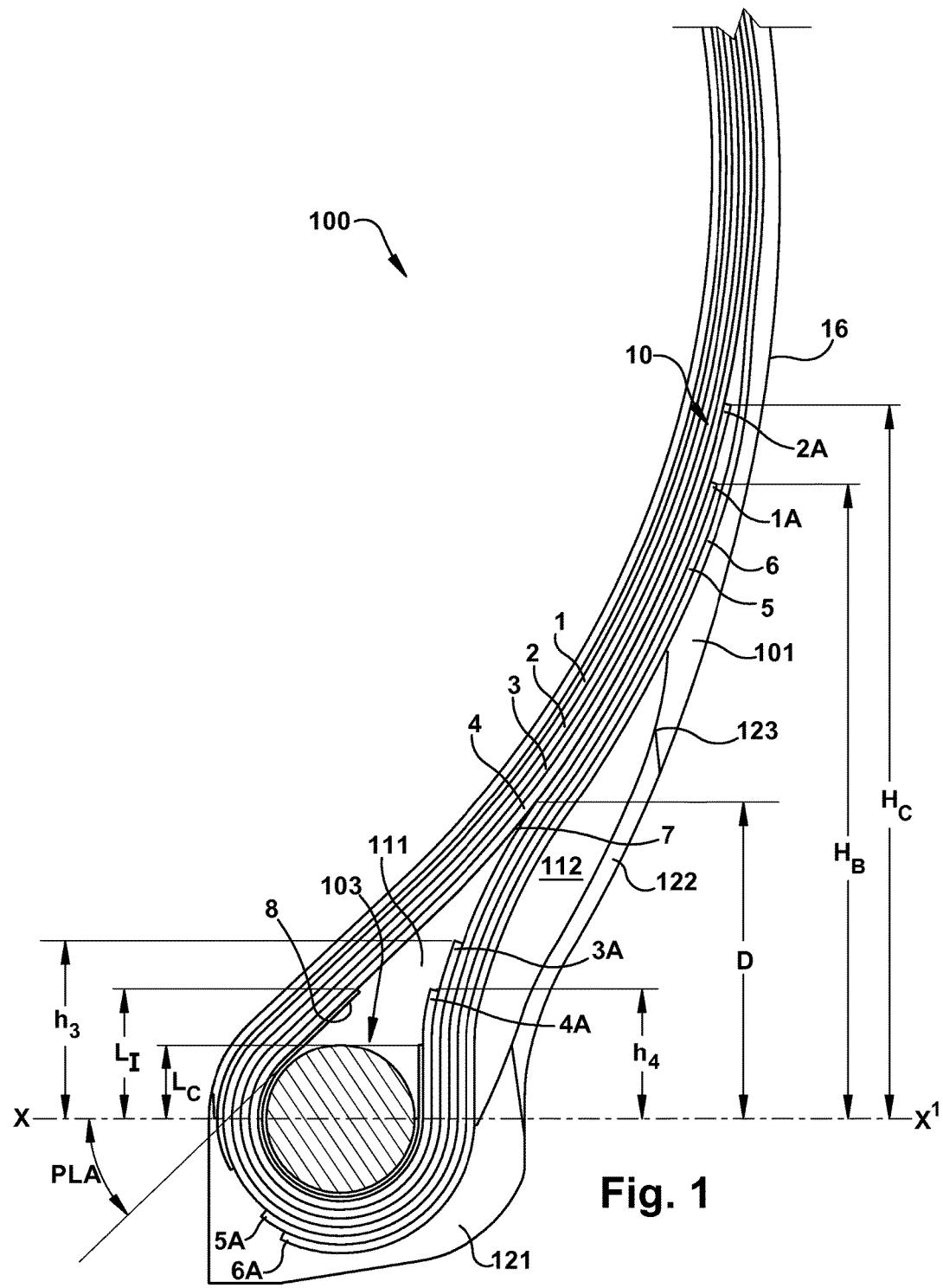
FIG. 1 is an example schematic partial cross-sectional view of a bead structure in accordance with the present invention.

FIG. 1 schematically shows a partial cross section of an example tire bead structure 100 of a pneumatic tire in accordance with the present invention. The example tire shown is that of a standard size tire 50×20.0 R22 with a load rating of 57,100 pounds and a pressure rating of 220 psi. Such a structure 100 may produce excellent durability and reduced chafing at the rim. A carcass reinforcement 10 may be formed of four axially inner plies 1,2,3 and 4, and two axially outer plies 5,6. The cross section of the bead 2 may be radially surmounted by a filler or first apex 111 of elastomeric mix having substantially the shape of a triangle in cross-section, the terminal end 7 of which extends radially from the axis of rotation of the tire a distance D from a reference line XX extending axially through the center of the bead wire. The axially inner carcass plies 1, 2, 3, 4 extend down from the tread and are positioned axially inward and are wrapped around the bead core 103, forming turn-ups 1A, 2A, 3A, 4A respectively. The turn-up 1A of the axially innermost carcass ply 1 may have its turnup end spaced radially from the line XX by the amount HB, which, for example, may be 116 mm or 1.5 times the Apex height or distance D, 56 mm. Further, for example, the turnup end 2A of the inner ply 2 may also be located radially above the terminal end 7 of the first apex 111 at a distance Hc of 130 mm. Turnups 1A, 2A are preferably located radially outward of the apex tip 7, and preferably higher than the chafer ending 123 of chafer 122. Turnups 4A and 5A are located radially inward of the apex height D. Preferably, the axially innermost ply 1 has the axially outermost turnup end 1A.

There is at least one carcass outer ply 5 that encases the turn-ups 1A, 2A, 3A, 4A, of the inner carcass plies 1, 2, 3 and 4. The axially outer ply 5 may, for example, be partially wound around the bead core 103 over a portion or circular arc corresponding to an angle at the center of the circle circumscribed on the bead core 103 equal to 180° or less so that the end 5A of the outer ply 5 is situated radially inward of the reference line XX. Preferably, there is a second axially outer ply 6 having a terminal end partially wound around the bead wire and is situated radially inward of the reference line XX.

Figure 2:
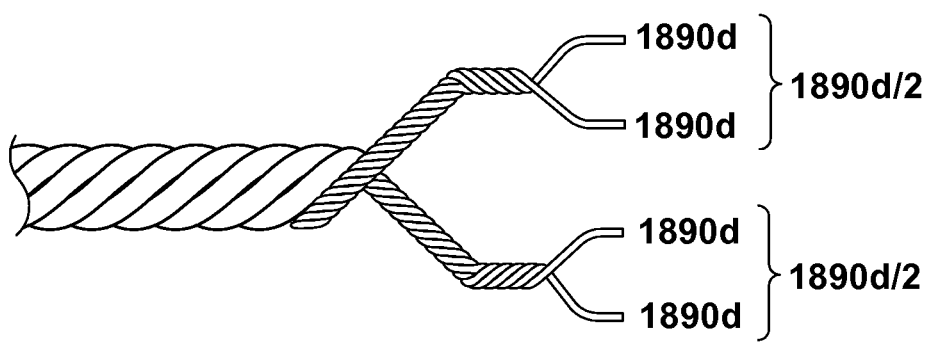
FIG. 2 is an exemplary schematic showing the cable construction of the ply cords.

The plies are formed from different materials so that the axially outermost plies 5,6 are formed from reinforcement cords that have the highest strength, lowest elongation than the axially inner carcass plies 1-4. Preferably, the reinforcement cords of ply 5,6 are formed from a nylon cable having a 1890 d/2/2 construction as shown in FIG. 2, i.e., formed from twisting together two sets of two 1890 denier yarns twisted together. Each set is twisted at 4 turns/inch in the Z direction, and then all of the yarns twisted together at 4 turns/inch in the S direction. The ply cords 5,6 are preferably formed from cable having the highest break strength and lowest elongation at break, relative to ply cords 1-4. More preferably, ply cords 5,6 have a 10-20% higher break strength than ply cords 3,4. More preferably, ply cords 5,6 have a 30-50% higher break strength than ply cords 1,2.

Ply cords 3,4 are preferably formed from reinforcements that have a higher elongation than cords 5,6 under the same load. A cord construction suitable for ply cords 3,4 are formed from a nylon cable having a 1890 d/2/2 5×6 construction, i.e., formed from a nylon cable having a 1890 d/2×2 construction, i.e., formed from twisting together two sets of two 1890 d yarns twisted together. Each set is twisted at 5 turns/inch in the Z direction, and then all of the yarns twisted together at 6 turns/inch in the S direction.

The axially innermost ply cords 1,2 are preferably formed from reinforcements having the highest elongation properties, and the lowest break strength, relative to ply cords 3-6. More preferably, ply cords 1,2 are formed from a nylon cable with 3 yarns having a linear density of 1890 denier, each yarn individually twisted at 6 turns/inch in the Z direction, and then all of the yarns twisted together at 6 turns/inch in the S direction.

In summary, the axially outermost or down carcass plies 5,6 are formed from reinforcement cables having the lowest elongation properties, and highest strength properties. The axially innermost plies 1,2 are formed from reinforcement cables having the highest elongation properties and lowest strength at break. The middle carcass plies 3,4 are formed from cables having medium elongation properties, i.e., having higher elongation properties than plies 5,6 and lower elongation properties than plies 1,2. Carcass plies 3,4 are formed from cables having a higher break strength than carcass plies 1,2 and a lower break strength than plies 5,6. The axially inner carcass plies 1-4 preferably have a 5-20% lower strength than the down carcass plies 5,6.

At least one of the axially inner plies 1-4 has a M300 rubber modulus in the range of 11-19 MPa while at least one axially outer ply 5,6 has a M300 rubber modulus in the range of 20-25 MPa.

The angle of the inner plies is measured by the angle shown in FIG. 1 designated as PLA. The angle PLA is the angle between the axial direction (line X-X') and the axially outermost ply 4 of the axially inner plies 1-4, or the ply closest to the bead core. The angle PLA is measured on the outermost ply 4 at a location radially outward of the bead core and radially inward of the tip of the bead apex. Preferably, PLA ranges from 40-55 degrees as measured on a new tire cut section that is not mounted on a rim and is not inflated.

A flipper 8 may separate the bead wire 103 from the carcass reinforcement 10 and be formed of radial textile cords identical to the carcass ply cords (or different cords). One terminal end of the flipper 8 may, for example, may extend a radial distance LI of 18 mm from the line XX, a distance that may be less than the distances HB and Hc referred to above. Three ends may thus be arranged radially above the terminal end A of the first apex 111 and be staggered between the terminal end and a location of the sidewall where the tire has a maximum axial width. The other terminal end of the flipper 8 may extend a radial distance $L_C$ from the line XX' equal to 10 mm.

The tire bead core 103 may be supplemented by a reinforcement ply or outer first chafer 121 reinforced with radial textile cords. The rubber chafer 121 may permit a better distribution of the pressures between the tire and its service rim, as well as assuring protection of the carcass plies against damage upon mounting. The axially outer end of the first chafer 121 may be slightly above (about 20 mm) the reference line XX.

An example tire with a bead structure as shown in FIG. 1 may include two annular bead portions/structures 100, a carcass 10 extending between the bead portions through two sidewall portions 101, and a tread portion (not shown). The carcass 10 may have at least one carcass ply 1 of parallel cords turned up about the bead portions 100, and a belt reinforcement layer (not shown) disposed radially outside the carcass 10 and radially inside the tread portion. Each annular bead portion 100 may include an annular bead core 103 having the carcass ply or plies 1A-1F turned up around the bead core, a first apex 111 disposed adjacent and radially outward of the bead core, a second apex 112 disposed axially outward of the bead core and the carcass ply or plies, a first chafer 121 disposed adjacent the carcass ply or plies and axially outward of the bead core, and a second chafer 122 disposed adjacent and axially outward of the second apex.

The first apex 111 may be constructed of a material with a 300 percent modulus between 18-25 MPa. The second apex may be constructed of a material with a 300 percent modulus between 14-18 MPa. The first chafer 121 may be constructed of a material with a 300 percent modulus between 17-21 MPa. The second chafer 122 may be constructed of a material with a 300 percent modulus between 7-9 MPa. The axially outer end of the second chafer 122 may be about 60 mm above the line $XX^1$. The axially outer end of the second chafer 122 may thus cover the contact area between the tire and the wheel flange under a 200% rated loading condition. The sidewall portion 101 may be constructed of a material with a 300 percent modulus between 3 MPa and 8 MPa.

As stated above, a bead structure 100 in accordance with the present invention produces excellent durability and reduced chafing at the rim. This bead structure 100 thus enhances the performance of the pneumatic tire, even though the complexities of the structure and behavior of the pneumatic tire are such that no complete and satisfactory theory has been propounded.

The previous descriptive language is of the best presently contemplated mode or modes of carrying out the present invention. This description is made for the purpose of illustrating an example of general principles of the present invention and should not be interpreted as limiting the present invention. The scope of the invention is best determined by reference to the appended claims. The reference numerals as depicted in the schematic drawings are the same as those referred to in the specification. For purposes of this application, the various examples illustrated in the figures each use a same reference numeral for similar components. The examples structures may employ similar components with variations in location or quantity thereby giving rise to alternative constructions in accordance with the present invention.

What is claimed is:

1. A pneumatic tire comprising:
   a first annular bead portion and a second annular bead portion, each bead portion having a bead core;
   a carcass extending between the bead portions through sidewall portions;
   and a tread portion, wherein the carcass includes at least two axially inner plies which extend down from the tread and axially inward of the bead core, said at least two axially inner plies being wound around the bead core forming respective turn-ups, each turnup being located axially outward of the bead core;
   said carcass further including a first axially outer ply which extends down from the tread towards the bead core and positioned axially outward of the bead core, wherein the first axially outer ply is formed from reinforcement cords having a lower % elongation at break than the reinforcement cords of the at least two axially inner plies.

2. The pneumatic tire of claim 1 further comprising a second axially outer ply having reinforcement cords having a higher break strength than the reinforcement cords of the axially inner plies.

3. The pneumatic tire of claim 1 wherein the angle of the reinforcement cords of the at least two axially inner plies is in the range of 40-55 degrees as measured with respect to an axial direction of the tire, when measured in the unmounted, uninflated new condition.

4. The pneumatic tire of claim 1 wherein the angle of the reinforcement cords of the at least two axially inner plies is in the range of 40-50 degrees as measured with respect to an axial direction of the tire, when measured in the unmounted, uninflated new condition.

5. The pneumatic tire of claim 1 wherein the reinforcement cords of the at least two axially inner plies are formed from nylon having a 1890d/3 6×6 cord construction.

6. The pneumatic tire of claim 1 wherein said carcass further comprises a third and fourth axially inner plies extending down from the tread and axially inward of the bead core being wound around the bead core forming turn-ups, wherein the third and fourth axially inner plies are located axially outward of the at least two axially inner plies, wherein a reinforcement cord of the third or fourth ply is formed from nylon having a 1890d/2/2 5×6 cord construction.

7. The pneumatic tire of claim 1 wherein the first axially outer ply is formed from nylon with a 1890d/2/2 4×4 cord construction.

8. The pneumatic tire of claim 1 wherein the first or second axially outer ply is formed from a higher strength rubber material than a rubber material of the at least two axially inner plies.

9. The pneumatic tire of claim 1 wherein the at least two axially inner plies are formed from a 1890d/3 6×6 cord construction.

10. The pneumatic tire of claim 1 wherein a reinforcement cord of the first axially outer ply has a 5-20% higher break strength than a reinforcement cord of the at least two axially inner plies.

11. The pneumatic tire of claim 1 wherein a reinforcement cord of the at least two axially inner plies has a 5-20% higher elongation at break than a reinforcement cord of the first or second axially outer plies.

\* \* \* \* \*